(12) United States Patent
Giurlani

(10) Patent No.: US 10,029,380 B2
(45) Date of Patent: Jul. 24, 2018

(54) CONTROL DEVICE FOR BLADES SHARPENING

(71) Applicant: FUTURA S.P.A., Capannori (LU) Fraz. Guamo (IT)

(72) Inventor: Giovacchino Giurlani, Capannori (IT)

(73) Assignee: FUTURA S.P.A., Guamo (IT)

( * ) Notice: Subject to any disclaimer, the term of this patent is extended or adjusted under 35 U.S.C. 154(b) by 119 days.

(21) Appl. No.: 15/038,866

(22) PCT Filed: Oct. 30, 2014

(86) PCT No.: PCT/IT2014/000283
§ 371 (c)(1),
(2) Date: May 24, 2016

(87) PCT Pub. No.: WO2015/079465
PCT Pub. Date: Jun. 4, 2015

(65) Prior Publication Data
US 2017/0021520 A1   Jan. 26, 2017

(30) Foreign Application Priority Data
Nov. 30, 2013 (IT) ................ FI2013A0292

(51) Int. Cl.
| | | |
|---|---|---|
| *B26D 7/12* | (2006.01) |
| *B24B 49/04* | (2006.01) |
| *B24B 49/00* | (2012.01) |
| *B24B 49/12* | (2006.01) |
| *B26D 3/16* | (2006.01) |
| *B24B 3/38* | (2006.01) |
| *B24B 3/46* | (2006.01) |
| *B26D 5/06* | (2006.01) |
| *G01B 7/28* | (2006.01) |

(52) U.S. Cl.
CPC ............ *B26D 7/12* (2013.01); *B24B 3/38* (2013.01); *B24B 49/003* (2013.01);
(Continued)

(58) Field of Classification Search
CPC .. B24B 3/46; B24B 3/463; B24B 9/00; B24B 19/002; B24B 49/003; B24B 49/02;
(Continued)

(56) References Cited

U.S. PATENT DOCUMENTS 5,793,493 A * 8/1998 Lane ............... G01B 11/24
356/613
6,332,375 B1 * 12/2001 Randl ............... B23D 63/12
76/37
(Continued)

FOREIGN PATENT DOCUMENTS

DE          23 59 227 A1      6/1974
DE   10 2006 019354 B3      7/2007
(Continued)

*Primary Examiner* — Timothy V Eley
(74) *Attorney, Agent, or Firm* — McGlew and Tuttle, P.C.

(57) ABSTRACT

Device for controlling the sharpening state of a blade (2) having a cutting edge (20) delimited by two sides (21, 22) converging towards a plane (X) that contains the cutting edge itself. The device comprises two control surfaces each of which is in contact with a corresponding side (21, 22) of the cutting edge (20) and is connected with a transducer (R4), which produces an electrical displacement signal (S4) proportional to a displacement of the control surface with respect to said plane (X). Furthermore, the device comprises a processing unit (E) that receives said displacement signals (S4) and compares them, emitting an error signal if the comparison produces a value that exceeds a predetermined limit. The control surfaces are the surfaces that delimit an external groove (40) of a roller (4) that is free to translate along an axis (A4) perpendicular to said plane (X) and spaced from the blade (2) by an amount such that said cutting edge (20) passes in said groove (40).

5 Claims, 2 Drawing Sheets

Figure 1:
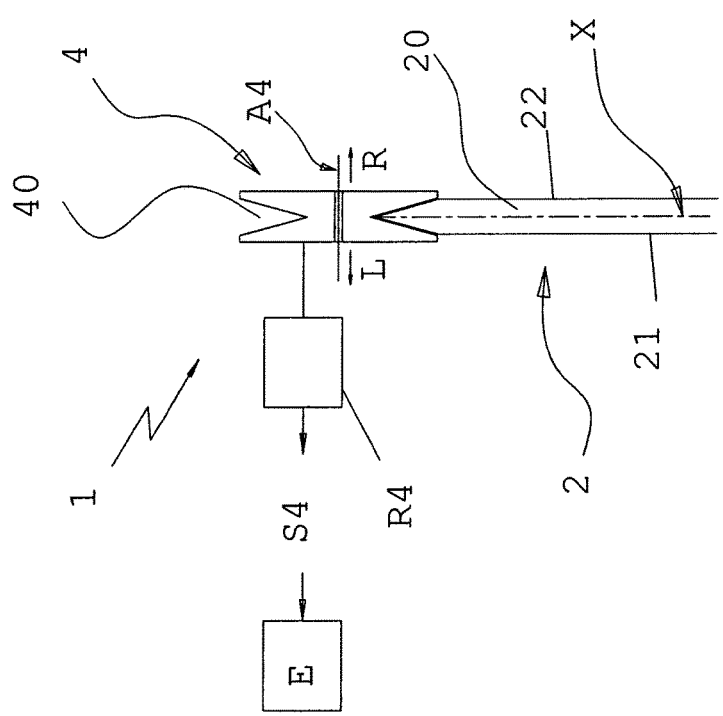

(52) U.S. Cl.
CPC ............ *B24B 49/045* (2013.01); *B24B 49/12* (2013.01); *B26D 3/16* (2013.01); *B24B 3/463* (2013.01); *B26D 5/06* (2013.01); *G01B 7/28* (2013.01)

(58) Field of Classification Search
CPC ....... B24B 49/04; B24B 49/045; B24B 49/10; B24B 49/12; B24B 51/00; B24D 15/06; B24D 15/063; B26D 1/14; B26D 7/12; G01B 7/28

See application file for complete search history.

(56) References Cited

U.S. PATENT DOCUMENTS

| | | | | |
|---|---|---|---|---|
| 6,662,072 | B2 * | 12/2003 | Berne | B24B 1/00 451/10 |
| 8,915,766 | B1 * | 12/2014 | Kolchin | B24B 3/54 451/45 |
| 9,079,284 | B2 * | 7/2015 | Christenson | B24B 3/54 |
| 9,393,662 | B2 * | 7/2016 | Schroeder | B24B 3/40 |
| 2001/0029148 | A1 * | 10/2001 | Knecht | B24B 3/36 451/11 |
| 2003/0019338 | A1 * | 1/2003 | Berne | B24B 1/00 83/13 |
| 2007/0162255 | A1 | 7/2007 | Chiu | |
| 2009/0077823 | A1 | 3/2009 | Rattunde | |
| 2011/0281503 | A1 * | 11/2011 | Knecht | B24B 3/54 451/5 |
| 2012/0118118 | A1 * | 5/2012 | Casella | B26D 7/24 83/62.1 |
| 2012/0156964 | A1 * | 6/2012 | Anderson | B24B 51/00 451/5 |

FOREIGN PATENT DOCUMENTS

| | | |
|---|---|---|
| EP | 1 609 570 A1 | 12/2005 |
| WO | 2004/035273 A1 | 4/2004 |

\* cited by examiner

CONTROL DEVICE FOR BLADES SHARPENING

The present invention relates to a device for controlling the sharpening state of band blades that can be used, in particular, for the production of paper rolls.

A conventional process for the production of paper rolls requires a rewinding machine by which a paper web is wound around a cardboard core to form an intermediate product, called "log", that is made by a paper roll obtained by winding the paper web around the cardboard tube and destined to be transversely cut to obtain shorter paper rolls, i.e. paper rolls that meet given commercial requirements.

The transverse cut of the logs is particularly critical. In fact, the cutting of the logs along planes that are not perfectly orthogonal to their longitudinal axis involves the formation of defective rolls, in which the side bases are oblique. This drawback is even more serious when the rolls are intended to be used in automatic dispensers which require, in fact, rolls with the side bases perfectly orthogonal to the axis of the rolls themselves, otherwise the rolls tend to get jammed in the dispenser.

The main object of the present invention is to provide a device that allows the elimination, or at least a great reduction, of the above-mentioned drawbacks.

This result is achieved, according to the present invention, by adopting the idea of realizing a device having the features indicated in claim 1 Other features of the invention are the subject of the dependent claims.

The present invention makes it possible to immediately check the sharpening state of the blade, checking the symmetry of the blade cutting edge and activating, when required, suitable sharpening means that can be directly or indirectly connected with the present device. Furthermore, the check is continuous and provides a check signal that can be used at any time. It is also noted that the checking process is essentially of mechanical nature, thus avoiding the negative influence of possible cutting residuals. Besides, the check does not provides negative effects on the operativeness of the checked machine. In addition, the present device can equip existing machines and can be integrated in existing production lines with relatively simple assembly operations. Further, the present device does not require major maintenance and keeps its characteristics basically unchanged even after prolonged use.

Figure 2:
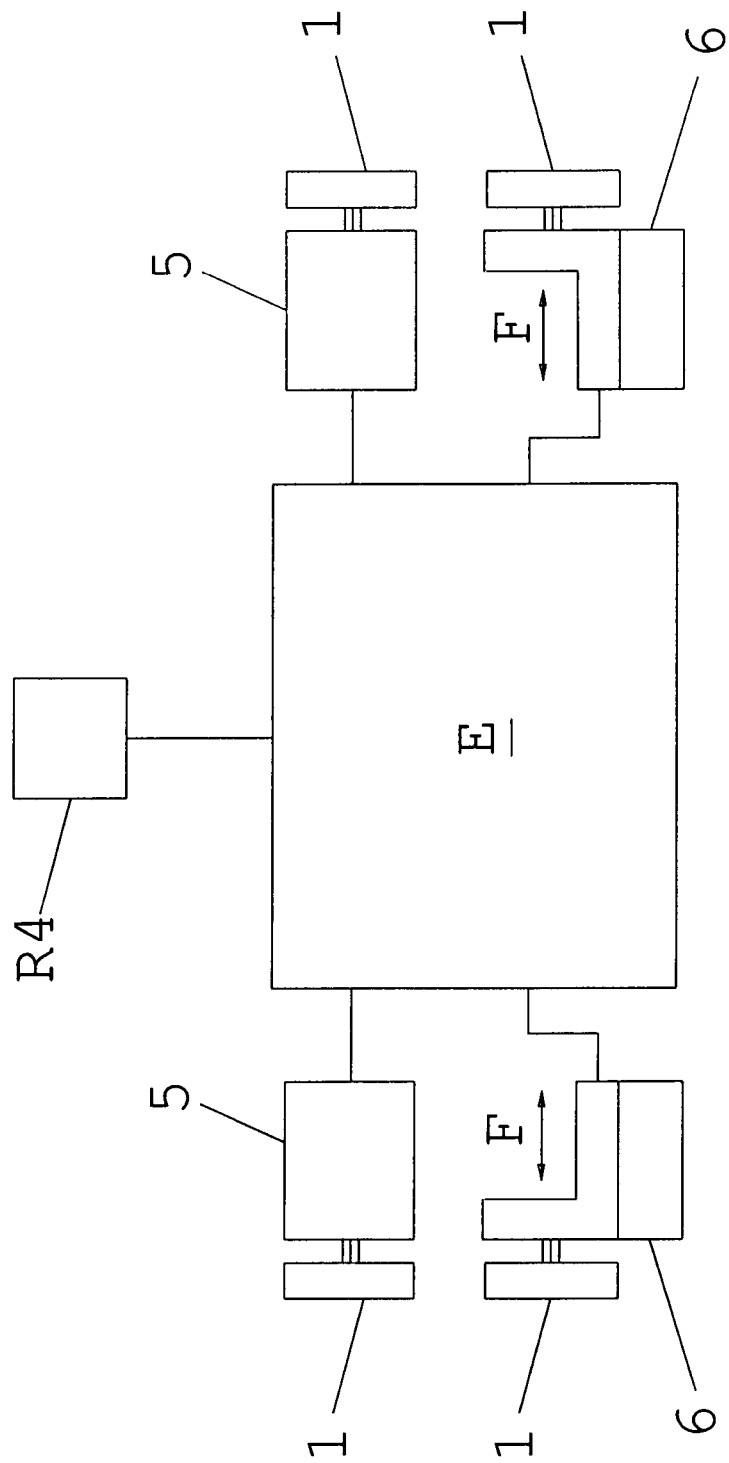

These and other advantages and features of the present invention will be best understood by anyone skilled in the art from the following description and with the help of the accompanying figures, given as a practical exemplification of the invention, but not to be considered in a limitative sense, in which:

FIG. 1 schematically shows a front view of a portion of a blade on which is arranged a control device in accordance with the present invention;

FIG. 2 schematically represents a possible operational implementation of a device in accordance with the present invention.

With reference to the attached drawings, a control device (1) according to the present invention is used to verify the correct sharpening of a band blade (2) formed by a laminar body provided with a sharp edge (20) delimited by two faces (21, 22) converging towards a plane (X) in which the cutting edge lies. According to the example shown in FIG. 1, the control device comprises a roller (4) with an external annular groove (40) in which passes the cutting edge (20) of the blade (2). The roller (4) is free to translate along an axis (A4) perpendicular to the plane (X) of the cutting edge (20). Preferably, the roller (4) is also free to rotate about said axis (A4).

In the example shown in FIG. 1, the roller (4) is associated with a lateral displacement detector (R4) constituted by a linear transducer which detects any displacement of the roller (4) to the right (R) or to the left (L) due to any possible asymmetric wear of the cutting edge (20). The displacement signal (S4) produced by the transducer (4) is received by a programmable electronic unit (E) which emits an error signal if the absolute value of the signal, which can have positive or negative sign depending on whether the roller (4) moves towards the right or left, exceeds a predetermined limit.

Thus, a device in accordance with the present invention comprises two control surfaces each of which is in contact with a corresponding side (21, 22) of said cutting edge (20) and is connected with a linear transducer (R4. According to the example described above, the control surfaces are the surfaces that delimit the groove (40) of the roller (4).

For example, the roller (4) can be made of steel, coated with wear-resistant ceramic material.

Said error signal can be used to control the automatic intervention of restoring means adapted to restore the sharpening of the blade. More particularly, the intervention of said restoring means can be activated/deactivated automatically when the absolute value of the error signal is greater/less than a predetermined reference value. For example, the restoration of the sharpening of the blade can be implemented by means of motorized grinding wheels (100) suitably arranged at the two sides of the blade, that is, by means of grinding wheels each of which is driven by a rotary actuator (101); by means of the actuators (101), the speed of rotation of the grinding wheels (100) is adjusted as long as the absolute value of the error signal is greater than the predetermined reference value.

Or, for example, if the grinding wheels (100) are grinding wheels each connected to a respective motorized slide (102), the restoration of the sharpening of the blade can be implemented by using the error signal for moving the motorized slides (102) adjusting the pressure exerted by the grinding wheels (100) on the two sides of the blade as long as the absolute value of the error signal is greater than the preset reference quantity as schematically indicated by the arrows "F" in FIG. 2.

The actuators (5) and the slides (6) are represented in the diagram of FIG. 2, in which, for simplification, both the actuators (5) and the slides (6) are connected to the unit (4), although, in general, in a sharpening device it is preferred to connect both grinding wheels to rotary actuators or to motorized slides.

The automatic restoration the blade sharpening can be selective in the sense that the left or the right grinding wheel (100) can be actuated depending on the sign, positive or negative, of the aforesaid error signal.

In practice, the details of execution may vary in any equivalent way as in the shape, dimensions, elements disposition, nature of the materials used, without leaving the scope of the adopted solution and thus remaining within the limits of the protection granted by this patent.

The invention claimed is:

1. A device for controlling a sharpening state of a blade having a cutting edge delimited by two sides converging towards a plane that contains the cutting edge, the device comprising:

two control surfaces, each of said two control surfaces being configured to be at least in contact with a corresponding side of said cutting edge and each of said two control surfaces being connected with a transducer, which produces a signal proportional to a displacement of at least one of the control surfaces with respect to said plane to provide at least a plurality of displacement signals;

a programmable electronic unit that receives said displacement signals and compares said displacement signals, said programmable electronic unit emitting an error signal if a comparison of said displacement signals produces a value that exceeds a predetermined limit, said two control surfaces being surfaces that delimit an external groove of a roller that is free to translate at least along an axis perpendicular to said plane and spaced from the blade by an amount such that said cutting edge passes in said groove.

2. A device according to claim 1, wherein said error signal is associated with one or more of a light signal and an acoustic signal.

3. A device according to claim 2, further comprising:
a means for supporting and moving a sharpening means, said programmable electronic unit being connected to said means for supporting and moving said sharpening means.

4. A device according to claim 1, further comprising:
a means for supporting and moving a sharpening means, said programmable electronic unit being connected to said means for supporting and moving said sharpening means.

5. A device according to claim 1, wherein said roller is free to rotate about said axis.

* * * * *